Patented July 16, 1946

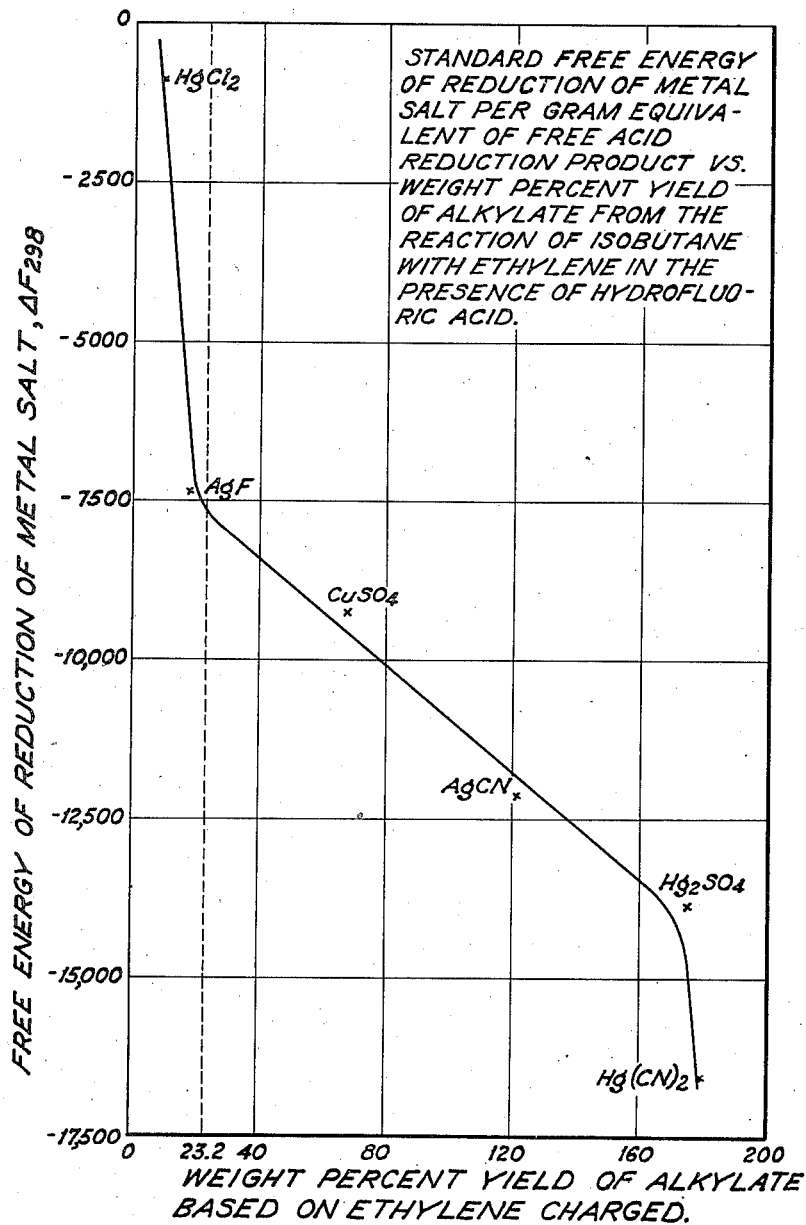

2,403,930

UNITED STATES PATENT OFFICE 2,403,930

ALKYLATION PROCESS

Carl S. Kuhn, Jr., Dallas, Tex., assignor to Socony-Vacuum Oil Company, Incorporated, New York, N. Y., a corporation of New York Application September 24, 1942, Serial No. 459,525

20 Claims. (Cl. 260—683.4)

This invention relates to the catalytic alkylation of isoparaffins with olefins. More particularly this invention relates to such a catalytic alkylation process in which ethylene is the olefinic alkylating agent used.

Many catalytic processes for the alkylation of isoparaffinic hydrocarbons with olefins have been developed in recent years. Such processes have been particularly concerned with the alkylation of such isoparaffins as isopentane and isobutane with such olefins as propylene and butylene to produce branched-chain hydrocarbons boiling in the gasoline range and having a high octane value. Typical of the catalytic agents which have been used are the Friedel-Crafts catalysts, especially aluminum chloride, boron trifluoride and its complexes, sulphuric acid and hydrofluoric acid and the like. The acid catalysts, sulphuric acid and hydrofluoric acid, have received particular attention as catalysts for the alkylation reactions of the type mentioned above. Hydrofluoric acid has proven especially effective as the alkylation catalyst as disclosed in my copending application Serial No. 320,097 filed February 21, 1940.

More recently various attempts have been made to improve the effectiveness of the various alkylation catalysts by the addition of certain salts of limited solubility or by the addition of certain oxides of elements selected from group 5 of the periodic system. Certain mercury salts alone or in admixture with other metallic salts have been claimed as giving improved results. Unfortunately the information as to the salts which should be used, the quantities of these salts, the particular catalysts with which they are effective, and the result to be obtained with their use is too general and indefinite to be of much assistance in predicting their utility in a specific alkylation process.

Alkylation with ethylene as the olefinic reactant has proven particularly troublesome. While butylene may be readily used as the olefinic reactant with any of the catalysts, and propylene may be used as the olefinic reactant where hydrofluoric acid is the catalytic agent used, satisfactory yields in the alkylation of isoparaffins with ethylene have not been possible up to the present time at least under the ordinary conditions of temperature and pressure. The addition of propylene to the ethylene and the subsequent alkylation of this olefin mixture has been proposed with the thought that the alkylation of the propylene would simultaneously induce the alkylation of the ethylene. While some improvement in ethylene alkylation is obtained, the increase in yield of ethylene alkylate by this method is limited and the process is complicated by the problem of handling a mixture of two olefins.

The primary object of my invention is to develop a catalytic process for the alkylation of such isoparaffins as isobutane, isopentane, and isohexane with ethylene to produce alkylates which are of value as high octane aviation and motor fuel ingredients. More specifically an object of my invention is to develop such a catalytic alkylation process in which hydrofluoric acid is the effective catalytic agent used.

Hydrofluoric acid offers many advantages as the catalytic agent for such an alkylation process because of the ease with which it may be separated from the reactants and products, and recovered for reuse. Hydrofluoric acid is also advantageous because of its noncorrosive action on steel equipment, and its low specific gravity enabling ready agitation and efficient contacting of the immiscible acid with the hydrocarbon reaction mixture. As set forth in my aforementioned copending application, the hydrofluoric acid is used either in the anhydrous form or as a concentrated aqueous acid of at least 90 percent concentration.

My invention is based upon my discovery that the alkylation of isoparaffins with ethylene utilizing hydrofluoric acid as the catalytic agent may be accelerated by the addition of certain metallic salts of inorganic acids, which salts are characterized by being easily reducible. I have found that where hydrofluoric acid is the effective catalytic agent used for the alkylation, such factors as solubility or insolubility of the salt in the acid, and the periodic classification of the metallic group are of no value in predicting the promotional effect of the metallic salt upon the alkylation reaction. For example, the soluble mercuric cyanide and the insoluble mercurous sulphate are both effective promoters. On the other hand the insoluble mercuric chloride and the soluble potassium sulphate or sodium fluoride are of absolutely no value as promoters. Some of the salts of mercury, for example, are excellent promoters, such as the cyanide and sulphate, while the chlorides, not only fail to accelerate the reaction, but actually retard it.

I have found that the metallic salts of inorganic acids, whose standard free energies of reduction to metal and non-aqueous acid are more negative than about −8,000 calories per gram equivalent of free acid reduction product will promote the alkylation of isoparaffins with ethylene. Typical of such salts are mercuric cyanide, mercuric sulphate, and copper sulphate. Of these salts mercuric cyanide is particularly effective as a promoter.

My invention, therefore, broadly consists in the treatment of an isoparaffinic hydrocarbon of the type of isobutane, isopentane, and isohexane with ethylene or with normally gaseous hydrocarbon mixtures consisting predominantly of ethylene, preferably at normal or moderately elevated temperatures in the presence of a hydrofluoric acid catalyst and an easily reducible metal salt whose standard free energy of reduction to metal and non-aqueous acid is more negative than about −8,000 calories and preferably more negative than about −12,500 calories per gram equivalent of free acid reduction product. The metal salt forming group of such easily reducible salts is characterized by the fact that the metal lies below hydrogen in the electromotive force series. As mentioned above not all the salts of such metals are effective, but only those having high negative free energies of reduction. Examples of salts which exert a promotional effect on the alkylation with ethylene are mercuric cyanide, mercuric sulphate, mercuric phosphate, mercurous sulphate, cupric sulphate and silver cyanide.

The alkylation reactions are generally carried out under sufficient pressure to maintain the reactants in the liquid phase, in the manner usually followed in alkylation reactions. In general, the conditions used for carrying out my process for alkylation with ethylene in the presence of hydrofluoric acid, are the same as for the conventional alkylation practice with this catalyst. The improved results are effected by the addition of a small quantity, preferably about 1 mol percent, of the metallic salts either as a solution or as a finely divided suspension in the acid. If desired the salt may also be introduced in the form of an aqueous suspension or solution, provided that the amount of water added is small, so that the concentration of hydrofluoric acid does not fall below about 90 percent as disclosed in my aforementioned copending application. Addition of the salt as a suspension in the hydrocarbons is also possible.

For the purpose of illustrating my invention the following specific examples are given. It is to be understood, however, that the invention is not to be limited by these examples, since variations therefrom may obviously be made by those skilled in the art without departing from the scope of my invention.

*Example 1*

A mixture of 303 parts by weight of concentrated hydrofluoric acid (99 percent concentration) to which had been added 30.3 parts by weight of copper sulphate, and 581 parts by weight of liquid isobutane was placed in a reactor provided with a suitable agitator and cooling jacket. The agitator was placed in operation and to the agitated mixture 56 parts by weight of ethylene were added continuously over a period of 140 minutes. During the addition of ethylene a slight temperature rise occured and cold kerosene was circulated through the cooling jacket to maintain the temperature of the reaction mixture at 20° C. After the addition of the ethylene was completed the agitation was discontinued and the mixture allowed to separate into two liquid phases. The upper phase consisted of the hydrocarbon reactants and the lower phase consisted principally of the hydrofluoric acid. The hydrofluoric acid was withdrawn and the hydrocarbon phase was washed with water, dried, and fractionated to recover the material distilling above 25° C. The yield of alkylate was 67.6 percent based on the weight of ethylene charged and 97 percent by weight of this alkylate product distilled below 125° C. This product was composed primarily of branched-chain hexanes and octanes of high antiknock value.

*Example 2*

A mixture of 312 parts by weight of concentrated hydrofluoric acid to which had been added 55.8 parts by weight of mercuric sulphate and 581 parts by weight of isobutane were placed in a reactor as described in Example 1. To this agitated mixture was added 56 parts by weight of ethylene over a period of 130 minutes. The temperature was maintained at 20° C. as in Example 1 and after the reaction was completed the phases were separated and recovered as described in Example 1. The yield of alkylate was 108.0 percent based on the weight of ethylene charged and 91 percent by weight of this alkylate distilled below 125° C.

*Example 3*

56 parts by weight of ethylene were added to a mixture of 302 parts by weight of hydrofluoric acid containing 50.2 parts by weight of mercuric phosphate and 581 parts by weight of liquid isobutane in a jacketed reactor in the manner described in Example 1. The yield of alkylate was 124.0 percent based on the weight of ethylene charged and of this alkylate 67 percent distilled below 125° C.

*Example 4*

56 parts by weight of ethylene were added over a period of 120 minutes to a mixture of 310 parts by weight of hydrofluoric acid to which had been added 25.4 parts by weight of silver cyanide, and 594 parts by weight of liquid isobutane in a jacketed reactor in the manner described in Example 1. The yield of alkylate was 125.7 percent based on the weight of ethylene charged and 86 percent by weight of this alkylate distilled below 125° C.

*Example 5*

56 parts by weight of ethylene were added over a period of 110 minutes to a mixture of 298 parts by weight of hydrofluoric acid to which had been added 94.5 parts by weight of mercurous sulphate, and 581 parts by weight of liquid isobutane in a jacketed reactor in the manner described in Example 1. The yield of alkylate was 178 percent based on the weight of ethylene charged and 73 percent by weight of this alkylate product distilled below 125° C.

*Example 6*

56 parts by weight of ethylene were added over a period of 100 minutes to a mixture of 303 parts by weight of concentrated hydrofluoric acid to which had been added 48.0 parts by weight of mercuric cyanide, and 581 parts by weight of liquid isobutane in a jacketed reactor in the manner described in Example 1. The yield of alkylate was 180.5 percent based on the weight of ethylene charged and 78 percent by weight of this alkylate product distilled below 125° C.

In order to show the effect of varying the concentration of the salt upon the yield of alkylate product the experiment of Example 6 was repeated using 1.90 mol percent of mercuric cyanide and 0.25 mol percent of mercuric cyanide in Examples 7 and 8, respectively, instead of the 1.25 mol percent used in the previous examples.

The procedure followed was the same as that used in Example 6, except that the weight of mercuric cyanide was varied as shown in the following chart wherein the quantities of reactants, products and yields are tabulated for easy comparison.

| Example No. | Isobutane, parts by wt. | Hydrofluoric acid, parts by wt. | Ethylene, parts by wt. | Mercuric cyanide, parts by wt. | Weight per cent yield of alkylate based on weight of ethylene added |
|---|---|---|---|---|---|
| 7 | 581 | 303 | 56 | 75.7 | 105.5 |
| 6 | 581 | 303 | 56 | 48.0 | 180.5 |
| 8 | 581 | 303 | 56 | 9.5 | 66.0 |

Mercuric cyanide was chosen as the promoter in these studies because it is soluble in the hydrofluoric acid catalyst. The effect of varying the concentration of a soluble promoter may be determined more accurately, since the concentration of the promoter remains unaffected by the efficiency of the agitation. An insoluble promoter, on the other hand, will tend to settle to the bottom of the reaction vessel and its promotional effect will depend not only upon the amount in the reactor relative to the amount of catalyst, but also upon the efficiency of agitation. These two factors combined determine the effective amount of promoter actually present in the reaction interface in the case of insoluble promoters.

The above group of examples with mercuric cyanide showed that the highest yields were obtained when about 1.25 mol percent of mercuric cyanide was added to the hydrofluoric acid catalyst. At 0.25 mol percent the yield was much less, and this represents about the minimum amount that may be used to obtain a worthwhile promotional effect. At 1.90 mol percent the yield fell off to about 60 percent of that obtained at 1.25 mol percent. The preferred range of salt addition for mercuric cyanide and the other hydrofluoric acid soluble salts is from 0.2 to 2.0 mol percent, with the best results being obtained by the use of from 1.0 to 1.5 mol precent of the salt. In the case of hydrofluoric acid insoluble salts, an upper limit to the amount of salt addition will have little meaning. With efficient agitation these insoluble salts give the best results when from 1.0 to 2.0 mol percent of the salt is used. In order to obtain the desired effect at least 0.5 mol percent should be added.

In order to illustrate the effect of temperature upon the reaction the following series of examples were performed. In these Examples 9 and 10 the quantites of reactants used, the conditions and the procedure followed were the same as used in Example 6, except that the temperature at which the reaction was carried out was varied as indicated in the following chart. However, the reaction was carried out in a steel, high pressure autoclave so that sufficient pressure could be maintained to keep the reactants in the liquid phase. In Example 11, the procedure of Example 7 was followed except that the reaction was carried out at a lower temperature.

| Example No. | Isobutane, parts by wt. | Ethylene, parts by wt. | Hydrofluoric acid parts by wt. | Mercuric cyanide, mol per cent of H. F. | Temp., °C. | Weight per cent yield of alkylate based on wt. ethylene added |
|---|---|---|---|---|---|---|
| 9 | 581 | 56 | 303 | 1.25 | 125 | 33.8 |
| 10 | 581 | 56 | 303 | 1.25 | 58 | 128.7 |
| 6 | 581 | 56 | 303 | 1.25 | 20 | 180.5 |
| 7 | 581 | 56 | 303 | 1.90 | 20 | 105.5 |
| 11 | 581 | 56 | 303 | 1.90 | -3.5 | 80.0 |

From these experiments it can readily be seen that the most favorable results are obtained by the use of temperatures between about −10° C. and about 80° C. The lower yield at −3.5° C. in Example 11 as compared with the yield at 58° C. in Example 10 was due principally to the higher salt concentration in the former case. The results at 20° C. indicate that a drop of approximately 40 percent in yield is to be expected due to this increase in concentration, and the yields obtained at 58° C. and −3.5° C. would seem to be of about the same order after adjustment for the difference in concentration is made. At temperatures much above 60° C., and particularly above about 125° C., the yield falls off very rapidly. The drop in yield below 0.0° C. is apparently much less rapid, but this drop, plus the increased difficulty in carrying out the exothermic reaction at low temperature levels, would render temperatures much below about −10° C. undesirable. The temperature for the ethylene alkylation with promoted hydrofluoric acid is therefore preferably maintained within the range of from about −10° C. to about 80° C. with the best results being obtained at temperatures below 30° C.

In order to illustrate the fact that the promoters used in my process have a very long life and are not used up appreciably in the course of the ethylene alkylation, the following experiment was performed.

*Example 12*

The experiment of Example 6 was repeated except that the run was continued for 10 hours, during which time 279 parts by weight of ethylene were added along with an additional 375 parts by weight of isobutane. No noticeable drop in catalyst activity took place, showing that the mercuric cyanide promoter has an appreciable catalyst life. The yield of alkylate in this case was 153.0 percent based on the weight of ethylene charged, and 74 percent by weight of this alkylate product distilled below 125° C.

In order to illustrate my invention further the following series of experiments was performed utilizing equimolar ratios of various metallic cyanides in suspension or in solution in the acid catalyst. The procedure outlined in Example 1 was followed in all the experiments except that the amount of the individual cyanide salts used was varied as indicated in the following chart:

| Example No. | Metal salt | Salt used in parts by wt. | Catalyst, parts by wt. | Isobutane, parts by wt. | Ethylene, parts by wt. | Weight per cent yield of alkylate based on weight of ethylene added |
|---|---|---|---|---|---|---|
| 13 | Zinc ferro-cyanide | 65.0 | 303 | 580 | 56 | 0 |
| 14 | Cuprous cyanide | 33.7 | 303 | 580 | 56 | 1.9 |
| 15 | Nickel cyanide | 21.0 | 303 | 580 | 56 | 5.2 |
| 16 | Zinc cyanide | 22.3 | 303 | 580 | 56 | 6.8 |
| 17 | Potassium ferri-cyanide | 62.5 | 303 | 580 | 56 | 10.4 |
| 18 | Lead cyanide | 49.3 | 303 | 580 | 56 | 12.5 |
| 19 | Barium cyanide | 36.0 | 303 | 580 | 56 | 15.3 |
| 4 | Silver cyanide | 25.4 | 310 | 594 | 56 | 125.7 |
| 6 | Mercuric cyanide | 48.0 | 303 | 581 | 56 | 180.5 |

An interesting feature of my invention is that such factors as temperature, catalyst concentration, and selection of salt promoter may be used to control the proportion of ethylene which is converted to alkylate products boiling below 125° C., principally hexanes, heptanes and octanes.

The following chart is a tabulation of the results obtained in Examples 1 to 11, wherein substantially the same quantities of isobutane, ethylene and hydrofluoric acid catalysts were used. The chart shows the total yield and the weight of total alkylate product distilling below 125° C. for different alkylating conditions of temperature, salt promoter concentration and for various typical salt promoters.

| Example No. | Salt promoter | Concentration mol per cent in H. F. | Temp., ° C. | Wt. per cent yield of alkylate | Wt. per cent of alkylate product distilling below 125° C. |
|---|---|---|---|---|---|
| 9 | Mercuric cyanide | 1.25 | 125 | 33.8 | 84.9 |
| 10 | do | 1.25 | 58 | 128.7 | 91.6 |
| 6 | do | 1.25 | 20 | 180.5 | 78.3 |
| 11 | do | 1.90 | −3.5 | 80.0 | 55.0 |
| 8 | do | 0.25 | 20 | 66.0 | 95.0 |
| 6 | do | 1.25 | 20 | 180.5 | 78.3 |
| 7 | do | 1.90 | 20 | 105.5 | 65.6 |
| 1 | Copper sulphate | 1.25 | 20 | 67.6 | 96.7 |
| 2 | Mercuric sulphate | 1.25 | 20 | 108.0 | 91.0 |
| 4 | Silver cyanide | 1.25 | 20 | 125.7 | 86.1 |
| 6 | Mercuric cyanide | 1.25 | 20 | 180.5 | 78.3 |
| 5 | Mercurous sulphate | 1.25 | 20 | 178.0 | 72.9 |
| 3 | Mercuric phosphate | 1.25 | 20 | 124.0 | 67.3 |

From a study of the above chart it appears that increasing the temperature up to 60° C. increases the percentage of material distilling below 125° C. Where the reaction is carried out at a temperature of 125° C. the percentage of lower boiling material decreases along with the sharp drop in the yield of total alkylate noted above. Likewise a decrease in the concentration of the salt promoter produces an increase in the percentage of material distilling below 125° C. Nearly a 30 percent increase in the weight percent of low boiling alkylate product is obtained by reducing the salt promoter concentration in the catalyst from 1.90 to 0.25 mol percent. Since the greatest yield of total alkylate occurs at an intermediate salt promoter concentration, operation at about 1 mol percent represents a compromise in the proportion of lower boiling alkylate product produced and at the same time results in the highest production of total alkylate.

In general the less active promoters such as copper sulphate, mercuric sulphate and silver cyanide favor the production of a higher percentage of lower boiling alkylate products than the more active salt promoters such as mercuric cyanide and mercurous sulphate. Mercuric phosphate apparently is an exception to this general rule since the production of total alkylate product when this salt is used is about the same as that obtained by the use of silver cyanide but with this salt the percentage of lower boiling alkylate material is considerably below that obtained even with the more active salt promoters.

For comparison purposes the following experiment was performed to show the relative amount of ethylene converted to ethylene-isobutane alkylate using unpromoted hydrofluoric acid as the catalyst.

Example 20

A mixture of 303 parts by weight of concentrated hydrofluoric acid and 581 parts by weight of isobutane were placed in a jacketed reactor provided with an agitator. To the well agitated mixture 56 parts by weight of ethylene were added continuously over a period of 120 minutes while maintaining the temperature below 30° C. as described in the preceding experiments. The mixture was drawn off and the hydrocarbon phase separated was analyzed to ascertain the percentage of the ethylene charged converted to alkylate. The yield was 23.2 weight percent.

While varying the reaction conditions and the isobutane-ethylene ratio will vary the weight percent yield of alkylate based on ethylene charged slightly, this figure of 23.2 percent represents a typical figure and conversions of the general order of about 25 percent are obtained for the unpromoted alkylation with ethylene.

The foregoing experiments illustrate the utility of my invention. Under normal liquid phase alkylating conditions hydrofluoric acid alone will produce yields of alkylate from the isoparaffin-ethylene reaction of not more than about 30 percent based on the weight of ethylene charged. By the addition of a small quantity, of the general order of about 1 mol percent, of metallic salts of inorganic acids whose standard free energy of reduction to metal and non-aqueous acid ($\Delta F_{298}$) is more negative than about $-8{,}000$ calories per gram equivalent of free acid reduction product, yields of from about 65 to about 180 percent of alkylate product based on ethylene charged are obtained under otherwise similar alkylating conditions. In general the higher the free energy of reduction of the metallic salt, the higher will be the yield of alkylate product. As shown on the chart in the drawing, mercuric cyanide and mercurous sulphate whose free energies of reduction are approximately $-16{,}500$ and $-13{,}700$ respectively, gave yields of over 175 percent, based on ethylene charged, whereas cupric sulphate whose free energy of reduction is about $-9{,}000$ gave a yield slightly in excess of 67 percent. In contrast thereto mercuric chloride and silver fluoride whose free energies of reduction are less than $-8{,}000$ calories per gram equivalent of free acid reduction product not only did not improve the yield of 23.2 percent obtained with the unpromoted hydrofluoric acid, but actually gave lower yields.

The effect of the various salts tested as promoters for the conversion of ethylene to alkylate in the presence of hydrofluoric acid is best illustrated by a study of the drawing, wherein the free energy of reduction of the metal salts is plotted against the weight percent yield of alkylate based on the weight of ethylene charged. The free energies of reduction of certain of the typical metallic salts studied were plotted against the weight percent yield of alkylate from the ethylene obtained when these salts were used as the promoting agents. From a smooth curve drawn through these values it can be seen that where the free energy of reduction of the metallic salt is less than about $-7{,}500$ calories no promotional effect is obtained since the curve lies to the left of the 23.2 percent of alkylate product yield line which represents the conversion obtained with the unpromoted hydrofluoric acid. At $-7{,}500$ the yield of alkylate product begins to rise sharply and at values greater than about $-8{,}000$ calories the metallic salts will assert a definite promotional effect upon the alkylation reaction. This increase in the amount of conversion obtained apparently continues uniformly with increasing free energy of reduction of the metallic salt until the percentage conversion reaches about 180 percent yield of the alkylate product, after which the curve levels off at slightly above 180 percent yield.

Of the many salts which I have tested only one exception to the foregoing rule has been observed. This salt is silver sulphate which is an easily reducible salt comparable with mercurous sulphate and for which nearly a 180 percent yield would be expected. However, in the case of silver sulphate no promotional effect toward the isobutane-ethylene reaction was observed. I believe that the peculiar behavior of silver sulphate is caused by its formation of a stable double salt with the hydrofluoric acid which double salt has much different properties than the silver sulphate alone. This property of silver sulphate to form very stable double salts with certain concentrated acids has been reported by J. Kendall and A. W. Davidson in the Journal of American Chemical Society, volume 43, on pages 979 and 990 (1921).

In the foregoing description of my invention I have referred to the free energy of reduction in every case on the basis of one gram equivalent of free acid reduction product, e. g.,

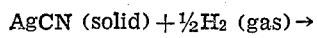
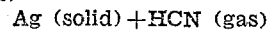

$\Delta F_{298} = -12{,}100$ calories

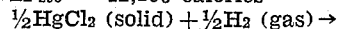
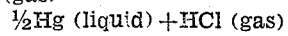

$\Delta F_{298} = -900$ calories

The theoretical reason underlying the relationship between the free energy of reduction of the metal salts and the effectiveness of these salts as promoters for the conversion of ethylene to alkylate in the presence of hydrofluoric acid is not clear. Very little is known about the mechanism of the reaction between paraffins and olefins in the presence of acidic catalysts, and therefore it is impossible to definitely explain the activating effect of the easily reducible metal salts on these acid catalysts. I have found, however, that no property of the salts will better relate their composition to their catalytic activity than their free energies of reduction. From a study it appears that only certain salts of the metals, particularly the sulphates, cyanides and phosphates are sufficiently easily reducible to make them useful as promoters of acidic alkylation catalysts. In any event, I have found that all the metallic salts whose free energy of reduction is more negative than $-8{,}000$ calories, with the single exception of silver sulphate, are effective.

In the foregoing description of my invention I have referred to the term standard free energy of reduction ($\Delta F_{298}$). By this term I mean the free energy of reduction, measured at 25° C. and determined on the basis of one gram equivalent of free acid reduction product.

In the specific examples I have illustrated the process as a batch operation in which ethylene is introduced into a vigorously agitated mixture of isoparaffin and catalyst. Obviously my process is well adapted to continuous operation as is conventional in alkylation practice with butylene, and operation in this manner is preferable for large scale, commercial practice.

The ethylene used in my process need not necessarily be pure. The gas may contain inert gaseous materials such as normal paraffins, and small amounts of other olefins.

In the foregoing description of my invention and in the appended claims, the term "isoparaffins" includes aliphatic, saturated hydrocarbons having a tertiary carbon atom and having from four to six carbon atoms.

The above description of my invention is merely illustrative of the preferred mode of operation thereof, and my invention should not be limited except as indicated in the appended claims.

I claim:

1. A process for the alkylation of isoparaffins with ethylene which comprises contacting the isoparaffin with the ethylene in the presence of hydrofluoric acid of at least 90 percent concentration and a metallic salt of an inorganic acid whose standard free energy of reduction to metal and non-aqueous acid is more negative than about $-8{,}000$ calories per gram equivalent of free acid reduction product, which salts do not form stable double salts with the acid catalyst, and are characterized by being the salt of a metal below hydrogen in the electromotive force series.

2. A process for the alkylation of isoparaffins with ethylene which comprises contacting the isoparaffin with the ethylene in the presence of hydrofluoric acid of at least 90 percent concentration and mercuric cyanide.

3. A process for the alkylation of isoparaffins with ethylene which comprises contacting the isoparaffin with the ethylene in the presence of hydrofluoric acid of at least 90 percent concentration and mercurous sulphate.

4. A process for the alkylation of isoparaffins with ethylene which comprises contacting the isoparaffin with the ethylene in the presence of hydrofluoric acid of at least 90 percent concentration and silver cyanide.

5. A process for the alkylation of isobutane with ethylene which comprises contacting the isobutane with the ethylene in the presence of hydrofluoric acid of at least 90 percent concentration and a metallic salt of an inorganic acid whose standard free energy of reduction to metal and non-aqueous acid is more negative than about —8,000 calories per gram equivalent of free acid reduction product, which salts do not form stable double salts with the acid catalyst, and are characterized by being a salt of a metal below hydrogen in the electromotive force series.

6. A process for the alkylation of isoparaffins with ethylene which comprises contacting the isoparaffin with the ethylene in the presence of hydrofluoric acid of at least 90 percent concentration and a metallic salt of an inorganic acid whose standard free energy of reduction to metal and non-aqueous acid is more negative than about —8,000 calories per gram equivalent of free acid reduction product, which salts do not form stable double salts with the acid catalyst and are characterized by being the salt of a metal below hydrogen in the electromotive force series, maintaining the temperature of the reaction mixture between —10° and about 80° C., and maintaining a pressure sufficient to keep the isoparaffin in the liquid phase.

7. A process for the alkylation of isobutane with ethylene which comprises contacting the isobutane with the ethylene in the presence of hydrofluoric acid of at least 90 percent concentration and a metallic salt of an inorganic acid whose standard free energy of reduction to metal and non-aqueous acid is more negative than about —8,000 calories per gram equivalent of free acid reduction product, which salts do not form stable double salts with the acid catalyst and are characterized by being the salt of a metal below hydrogen in the electromotive force series, maintaining the temperature of the reaction mixture between —10° and about 80° C., and maintaining a pressure sufficient to keep the isobutane in the liquid phase.

8. A process for the alkylation of isobutane with ethylene which comprises contacting the isobutane with the ethylene in the presence of hydrofluoric acid of at least 90 percent concentration and mercuric cyanide, maintaining the temperature between —10° and about 80° C. and maintaining a pressure sufficient to keep the isobutane in the liquid phase.

9. A process for the alkylation if isoparaffins with ethylene which comprises contacting the isoparaffin with the ethylene in the presence of hydrofluoric acid of at least 90 percent concentration and from 0.1 to 10 mol percent of the amount of hydrofluoric acid of a metallic salt of an inorganic acid whose standard free energy of reduction to metal and non-aqueous acid is more negative than about —8,000 calories per gram equivalent of free acid reduction product, which salts do not form stable double salts with the acid catalyst and are characterized by being the salt of a metal below hydrogen in the electromotive force series.

10. A process for the alkylation of isoparaffins with ethylene which comprises contacting the isoparaffin with ethylene in the presence of hydrofluoric acid of at least 90 percent concentration and from 0.2 to 2.0 mol percent, based on the amount of hydrofluoric acid, of a hydrofluoric acid soluble metallic salt of an inorganic acid, whose standard free energy of reduction to metal and non-aqueous acid is more negative than about —8,000 calories per gram equivalent of free acid reduction product, which salts do not form stable double salts with the acid catalyst, and are characterized by being the salt of a metal below hydrogen in the electromotive force series.

11. A process for the alkylation of isoparaffins with ethylene which comprises contacting the isoparaffin with ethylene in the presence of hydrofluoric acid of at least 90 percent concentration and from 1.0 to 1.5 mol percent, based on the amount of hydrofluoric acid, of a hydrofluoric acid soluble metallic salt of an inorganic acid, whose standard free energy of reduction to metal and non-aqueous acid is more negative than about —8,000 calories per gram equivalent of free acid reduction product, which salts do not form stable double salts with the acid catalyst, and are characterized by being the salt of a metal below hydrogen in the electromotive force series.

12. A process for the alkylation of isobutane with ethylene which comprises contacting the isobutane with the ethylene in the presence of hydrofluoric acid of at least 90 percent concentration and from 1.0 to 1.5 mol percent of mercuric cyanide based on the amount of hydrofluoric acid.

13. A process for the alkylation of isoparaffins with ethylene which comprises contacting the isoparaffin with the ethylene in the presence of hydrofluoric acid of at least 90 percent concentration and from 1.0 to 2.0 mol percent based on the amount of hydrofluoric acid, of a hydrofluoric acid insoluble metallic salt of an inorganic acid whose standard free energy of reduction to metal and non-aqueous acid is more negative than about —8,000 calories per gram equivalent of free acid reduction product, which salts do not form stable double salts with the acid catalyst, and are characterized by being the salt of a metal below hydrogen in the electromotive force series.

14. A process for the alkylation of isoparaffins with ethylene which comprises contacting the isoparaffin with the ethylene in the presence of hydrofluoric acid of at least 90 percent concentration and more than 0.5 mol percent based on the amount of hydrofluoric acid, of a hydrofluoric acid insoluble metallic salt of an inorganic acid, whose standard free energy of reduction to metal and non-aqueous acid is more negative than about —8,000 calories per gram equivalent of free acid reduction product, which salts do not form stable double salts with the acid catalyst, and are characterized by being the salt of a metal below hydrogen in the electromotive force series.

15. A process for the alkylation of isobutane with ethylene which comprises contacting the isobutane with the ethylene in the presence of hydrofluoric acid of at least 90 percent concentration and a metallic salt of an inorganic acid whose standard free energy of reduction to metal and non-aqueous acid is more negative than about —8,000 calories per gram equivalent of free acid reduction product, which salts do not form stable double salts with the acid catalyst and are characterized by being the salt of a metal below hydrogen in the electromotive force series, maintaining the temperature of the reaction mixture between 0 and about 30° C., and maintaining a pressure sufficient to keep the isobutane in the liquid phase.

16. A process for the alkylation of isobutane with ethylene which comprises contacting the isobutane with the ethylene in the presence of hydrofluoric acid of at least 90 percent concentration and mercuric cyanide, maintaining the temperature at about 20° C. and maintaining a pressure sufficient to keep the isobutane in the liquid phase.

17. A process for the alkylation of isoparaffins with ethylene which comprises contacting the isoparaffin with the ethylene in the presence of hydrofluoric acid of at least 90 percent concentration and a metallic salt of an inorganic acid, soluble in hydrofluoric acid, whose standard free energy of reduction to metal and non-aqueous acid is more negative than about —8,000 calories per gram equivalent of free acid reduction product, which salts do not form stable double salts with the acid catalyst, and are characterized by being the salt of a metal below hydrogen in the electromotive force series, and controllling the ratio of alkylate product boiling below 125° C. to alkylate product boiling above 125° C. by controlling the concentration of the salt in the hydrofluoric acid.

18. A process for the alkylation of isoparaffins with ethylene which comprises contacting the isoparaffin with the ethylene in the presence of hydrofluoric acid of at least 90 percent concentration and a metallic salt of an inorganic acid whose standard free energy of reduction to metal and non-aqueous acid is more negative than about —8,000 calories per gram equivalent of free acid reduction product, which salts do not form stable double salts with the acid catalyst, and are characterized by being the salt of a metal below hydrogen in the electromotive force series, maintaining the temperature of reaction mixture within the range of between —10° and about 125° C., and controlling the ratio of alkylate product boiling below 125° C. to alkylate product boiling above 125° C. by controlling the temperature at which the reaction is carried out within the temperature range.

19. A process for the alkylation of isoparaffins with ethylene which comprises contacting the isoparaffin with the ethylene in the presence of hydrofluoric acid of at least 90 percent concentration and a salt, of a metal below hydrogen in the electromotive force series with an inorganic acid, whose standard free energy of reduction to metal and non-aqueous acid is more negative than about —8,000 calories per gram equivalent of free acid reduction product, other than silver sulphate.

20. A process for the alkylation of isobutane with ethylene which comprises contacting the isobutane with the ethylene in the presence of hydrofluoric acid of at least 90 percent concentration and a salt, of a metal below hydrogen in the electromotive force series with an inorganic acid, whose standard free energy of reduction to metal and non-aqueous acid is more negative than about —8,000 calories per gram equivalent of free acid reduction product, other than silver sulphate.

CARL S. KUHN, Jr.